United States Patent
Chau et al.

(10) Patent No.: US 8,483,367 B1
(45) Date of Patent: Jul. 9, 2013

(54) MESSAGING IN A HOSTED PRIVATE BRANCH EXCHANGE

(75) Inventors: Vi Chau, San Francisco, CA (US); Jian Lin, Dublin, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/584,505

(22) Filed: Aug. 13, 2012

(51) Int. Cl.
*H04M 1/64* (2006.01)

(52) U.S. Cl.
USPC ................................ 379/88.22; 379/88.12

(58) Field of Classification Search
USPC ............ 379/88.12, 88.23, 252, 88.19, 201.01
See application file for complete search history.

(56) References Cited

U.S. PATENT DOCUMENTS

| | | | |
|---|---|---|---|
| 7,362,852 B1 * | 4/2008 | Rodkey et al. | 379/88.12 |
| 8,213,587 B2 | 7/2012 | Vendrow | |
| 2008/0263169 A1 * | 10/2008 | Brabec et al. | 709/206 |
| 2009/0086953 A1 | 4/2009 | Vendrow | |

* cited by examiner

*Primary Examiner* — Amal Zenati
(74) *Attorney, Agent, or Firm* — Schwegman Lundberg & Woessner, P.A.

(57) ABSTRACT

A hosted private branch exchange (PBX) system is provided that includes: non-transitory storage that includes subscriber identifying information that identifies a subscriber to a message routing service; non-transitory storage that includes distribution rules information associated with the identified subscriber; and a message management server configured to receive a message sent over the Internet to the identified subscriber and to send the message over the Internet to one or more devices according to the distribution rules associated with the identified subscriber.

18 Claims, 10 Drawing Sheets

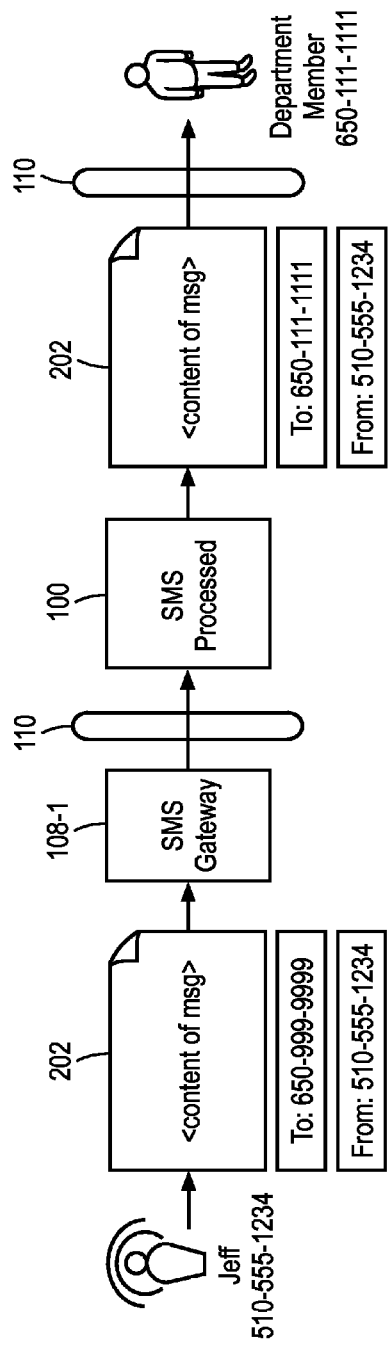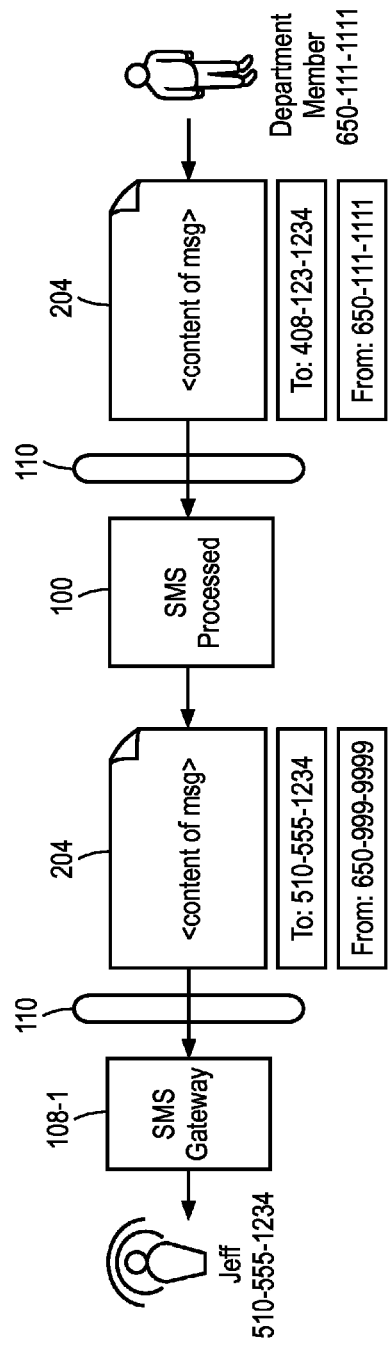

Dept. Outsider User Device UI View

US 8,483,367 B1

MESSAGING IN A HOSTED PRIVATE BRANCH EXCHANGE

BACKGROUND

Advances in wireless networking and messaging technologies have given mobile users opportunities to engage in a variety of different Internet and non-Internet based communications. For example, existing devices and platforms include personal digital assistants (PDAs), cell phones with wireless application protocol (WAP) or short message service (SMS), e-mail devices supporting Post Office Protocol 3 (POP3) and/or (Internet Message Access Protocol) IMAP, facsimile services and instant messaging. A hosted communication system includes telecommunication servers accessible over the Internet that can enable integration between these and other Internet- and non-Internet based communication services.

SUMMARY

In one aspect, a hosted private branch exchange (PBX) system includes storage media that stores subscriber identifying information that identifies a subscriber to a message routing service and that stores distribution rules information associated with the identified subscriber. A message management server is configured to receive a message sent over the Internet to the identified subscriber and to send the message over the Internet to one or more devices according to the distribution rules associated with the identified subscriber.

BRIEF DESCRIPTION OF DRAWINGS

FIG. 2A is an illustrative drawing showing an example of message flow and phone number transformations involving the communication system of FIG. 1 in which a department outsider sends a message to a department in accordance with some embodiments.

FIG. 2B is an illustrative drawing showing an example of message flow and phone number transformations involving the communication system of FIG. 1 in which a department member sends a message in response to the message of FIG. 2A in accordance with some embodiments.

DESCRIPTION OF EMBODIMENTS

Figure 1:
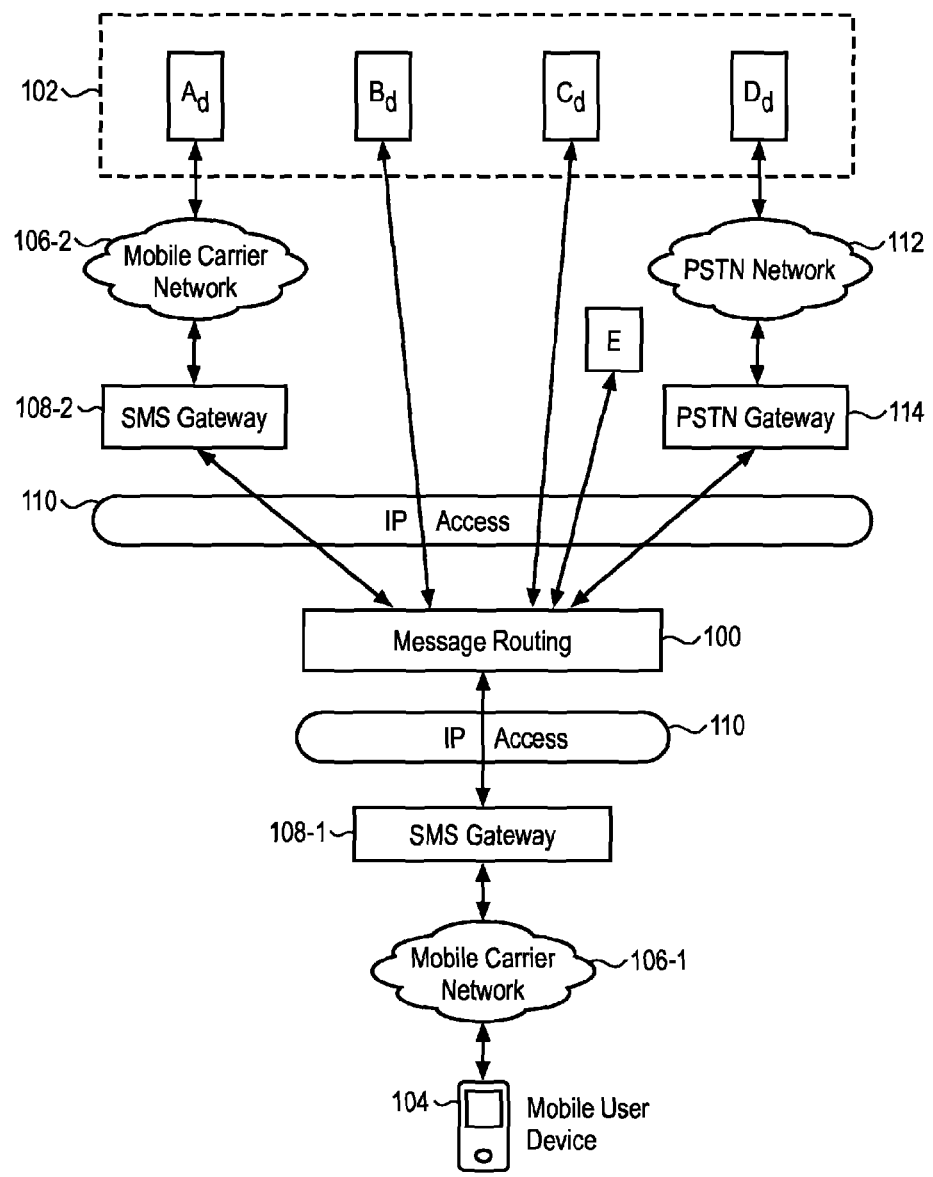
FIG. 1 is an illustrative functional block diagram showing a hosted PBX departmental message system supporting an department message flow involving mobile devices of department members and a mobile device of a user who is not a department member in accordance with some embodiments.

The following description is presented to enable any person skilled in the art to create and use a method and system to provide routed messages that can be routed over the Internet according to custom routing rules. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

FIG. 1 is an illustrative functional block diagram showing a hosted PBX message communication system 100 that includes one or more processors configured to support departmental message flow involving mobile devices of department members and a mobile device of a user who is not a department member in accordance with some embodiments. As used herein, the term "department" signifies one or more users that are members of a group (i.e., department) that can be reached from a telephone number (i.e., a department telephone number). As such, a department can have a subscriber account and can be a subscriber to message services provided by the system 100. Custom departmental message routing rules described in detail below, can be created to route messages among members of a subscribing department. It should be noted that a given user can belong to zero, one, or more departments. As used herein, the term "message" signifies a short text message that is sent to or from a communication device over a direct connection with a wireless mobile telecommunication network or the Internet that is compatible with the short message service ("SMS") protocol. Telecommunication standards that support sending and receiving messages include, GSM, ANSI CDMA networks, AMPS, satellite and landline networks, for example. Internet standards that support sending and receiving messages include HTTP(S), or SIP and RTP, over TCP/IP or UDP. A text message may have attachments such as images, video or audio files, for example. A messaging service application accessible from a World Wide Web ("WWW") browser or installed on a computing device, such as a desktop or laptop computer or a mobile device, can use standard telecommunications or Internet protocols to exchange short messages with other fixed line or mobile devices.

An illustrative example department subscriber indicated by dashed lines 102 in FIG. 1 includes four department members associated with mobile devices $A_d$, $B_d$, $C_d$ and $D_d$. A user associated with mobile user device 104 communicates with the department 102 and department members communicate with each other in the course of that user communication as described below. Moreover, device E owned by an individual user subscriber to the message services of the system 100 also may exchange messages with mobile user device 104. While the example shows mobile devices, the devices used by department members and the user may include desktop computers, laptop computers, smartphones, tablets, Internet Protocol ("IP") phones, or any other devices that can handle the sending or receiving of messages over a telephone network or the Internet.

In the illustrative example, the user device 104 sends and receives messages directly over a mobile carrier network 106-1. A short message service ("SMS") gateway 108-1 acts as an interface between the Internet 110 and the wireless carrier network 108-1. For example, an SMS gateway may process a message received over a wireless carrier network for transmission over the Internet, and conversely, may process a message received over the Internet for transmission over a wireless network. The Internet 110 transmits messages exchanged between the user device 104 and the message system 100. The Internet 110 also is involved in communicating messages between the department 102 and the user device 104 and between department members. In the illustrative example, communication between the message system 100 and department device $A_d$ involves transmission of messages over mobile carrier network 106-2. An SMS gateway 108-2 acts as an interface between the Internet and the mobile carrier network 106-2. Department device $D_d$ sends and receives telephone calls over a PSTN 112. A PSTN gateway 114 acts as an interface between the Internet 110 and PSTN 112 for voice calls. However, since many PSTN networks do not support messaging protocols like SMS, the user of Department device $D_d$ must send and receive messages over a different device that supports SMS, such as over a web interface on a personal computer, application on a mobile device, or an IP phone that can send or receive messages.

An overview of example behavior of the message system 100 according to department message distribution rules having processors (not shown) configured to implement department messaging is explained with reference to the following Chart 1, which provides examples of illustrative use cases involving messaging in which a user of user device 104 and department member devices 102 send and receive messages.

CHART 1

Departmental Messaging Use Cases:

| Case # | Sender (To:) | Sender's Receiver(s) (From:) | First Department Member Responder (To:) | First Responder's Receiver(s) (From:) | Second Department Member Responder (To:) | Second Department Responder's Receiver(s) (From:) |
|---|---|---|---|---|---|---|
| 1 | $A_d$ (Dept) | $B_d$, $C_d$, $D_d$ ($A_d$) | $B_d$ (Dept) | $A_d$, $C_d$, $D_d$ ($B_d$) | NA | NA |
| 2 | $A_d$ (Dept) | $B_d$, $C_d$ and $D_d$ ($A_d$) | $B_d$ ($A_d$) | $A_d$ ($B_d$) | NA | NA |
| 3 | $A_d$ (Dept) | $B_d$, $C_d$, $D_d$ ($A_d$) | $B_d$ (X) | X ($B_d$) | NA | NA |
| 4 | Non-Dept User (Dept) | $A_d$, $B_d$, $C_d$, $D_d$ (User) | $B_d$ (User) | User (Dept); $A_d$, $C_d$, $D_d$ ($B_d$) | $C_d$ ($B_d$) | $A_d$, $B_d$, $D_d$ ($B_d$); User (Dept) |
| 5 | Non-Dept User ($A_d$, $B_d$) | $A_d$, $B_d$ (User) | $B_d$ ($C_d$) | $C_d$ ($B_d$) | NA | NA |
| 6 | Non-Dept User ($A_d$, $B_d$) | $A_d$, $B_d$ (User) | $B_d$ (User) | User ($B_d$) | NA | NA |

In the illustrative use case #1, a department member associated $A_d$ sends a message to the entire department 102. The system 100 sends a message to all department members' devices indicating that department member $A_d$ is the sender. Department member associated with $B_d$ responds to the message from user $A_d$ by sending a message to the entire department 102. The message system 100 sends department member $B_d$ message to all department members indicating that the message is from department member $B_d$.

The illustrative use case #2 is like that of use case #1 except that department member $B_d$ responds to the message from $A_d$ by sending a message to department member $A_d$ only. The system 100 will cause the message from the department member user of $B_d$ to the department member user of $A_d$ to appear in the respective inboxes of these devices as a thread between the two of them rather than as a department thread.

The illustrative use case #3 is like that of use case #1 except that department member user of device $B_d$ responds to the message from user of device $A_d$ by sending a message to a user of a device "X" (not shown) who is not a department member. The system 100 caused the message from the department member user of $B_d$ to the non-member user of device X to appear in the respective inboxes of these devices as a thread between the two of them and not as a department thread.

In the illustrative use case #4, a user of device 104, who is not a department member, sends a message to the department 102. The system 100 responds to the message for the device 104 user by sending a message to all department members' devices clearly indicating that the message is from a sender who is not a department member. A department member associated with device $B_d$ sends a message to the user in response. The system 100 sends the message from $B_d$ to the user device 104 and indicates in the message that the message is from the department (and not directly from the user of device $B_d$). The system 100 also sends the message from $B_d$ to all department members. The system 100 causes messages from $B_d$ to department members to indicate that the messages is from $B_d$, individually, and causes a message thread for those department members receiving the message from $B_d$ to indicate that the message from $B_d$ is department message. Department member associated with device $C_d$ also responds to the message sent by non-department user of device 104 by sending a message directed that non-department user. The system 100 sends the message from $C_d$ to the user device 104 and indicates in the message that the message is from the department. The system 100 also sends the message from $C_d$ to all department members causes those messages to indicate that the messages is from $C_d$, individually, and causes the message thread for those department members receiving the message from $C_d$ to indicate that the message from $C_d$ is department message.

In the illustrative use case #5, a non-department member user of device 104 sends a message to department members $A_d$ and $B_d$ individually. The system 100 sends the message from the user of device 104 with no indication that the message is a department message. The system 100 causes communication from the device 104 user to appear as a separate non-departmental message thread in the inboxes of users of devices $A_d$ and $B_d$. Department member $B_d$ sends a message that forwards the user message to department member user of device $C_d$. The system 100 sends the $B_d$ message to department member device $C_d$, that indicates that the message is from the user of $B_d$ and that the message is not a department message, and also causes the message from $B_d$ to $C_d$ to appear in an existing thread from the user of device 104 to the department member user of device $B_d$.

The illustrative use case #6 is like that of use case #5 except that department member $B_d$ responds to the message from the user of device 104 by sending a message to the device 104 user. The system 100 causes the message from the department member user of $B_d$ to the user to appear as a message from the user of device $B_d$ and not as a message from the department 102.

FIG. 2A is an illustrative drawing showing an example of message flow and phone number transformations involving the system 100 of FIG. 1 in which a non-department user (i.e. a department outsider) sends a message to a department in accordance with some embodiments. In this example, assume that a non-department user "Jeff" associated with a device 104 having a phone number 510-555-1234 sends a message 202 over the wireless carrier network 106-1 to department phone number 650-999-9999, which in this example is assumed to be a phone number associated with department 102. The message 202 is processed by SMS gateway 108-1 for delivery over the Internet 110 to the system 100. The system 100 processes the message 202 (processing described in more detail in FIGS. 6, 7, 8, and 9) and sends the message 202 over the Internet 110 to a department member, e.g., the user of device $A_d$. Note that in order to simplify the example, only one department member is shown, but based upon the use cases above, it will be appreciated that all department members receive the message 202. In this example, the department member is associated with a device having a phone number 650-111-1111. Depending on the department member's settings the message 202 sent from number 510-555-1234 appears to the device used by department member to originate from the original sender's phone number 510-555-1234 and/or a combination of the phone numbers representing the path that message 202 took to the department member's device (e.g., by prepending or appending the phone numbers to the message content).

FIG. 2B is an illustrative drawing showing an example of message flow and phone number transformations involving the system 100 of FIG. 1 in which a department member sends a message in response to the message of FIG. 2A in accordance with some embodiments. A department member uses the communication device associated with phone number 650-111-1111 to send a message to the original sender's phone number 510-555-1234 over the Internet 110 for delivery to the department outsider, "Jeff". Note that the message 204 is sent over the Internet (rather than a telephone network) when the department member is using a web interface or software application that can communicate directly with the system 100. The communication system 100 processes the message 204 (processing described in more detail in FIGS. 6, 7, 8, and 9), including, for example, assigning the department phone number 650-999-9999 to the FROM: field of the message 204, and sends the message over the Internet 110 to the SMS gateway 108-1, which processes the message for delivery over the cellular telephone network to the user device 104. It will be appreciated that the system also sends the content of message 204 to other department members, but the messages to the other department members are not shown in order to simplify the explanation.

Figure 3:
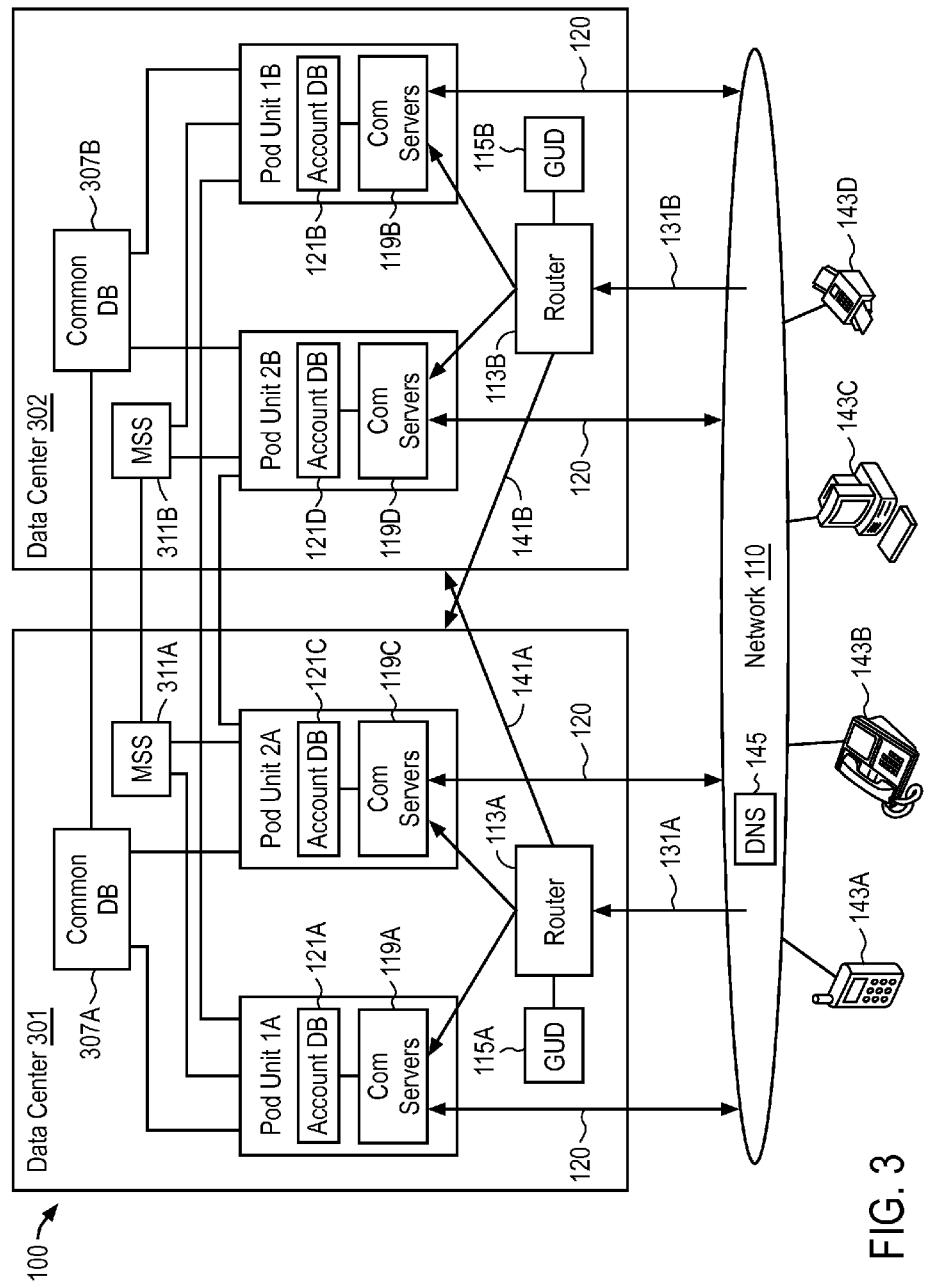
FIG. 3 is an illustrative architecture level diagram of a communication system that can be configured to implement the hosted PBX departmental message system of FIG. 1 in accordance with some embodiments.

FIG. 3 is an illustrative architecture level diagram of a communication system 300 that can be configured to implement the hosted PBX message system 100 of FIG. 1 in accordance with some embodiments. A conventional PBX system typically connects phones of PBX system subscribers with each other and with the PSTN. A hosted PBX system comprises servers that are accessible over the Internet and that provide phone call and phone message routing and delivery services over the Internet to and from subscribers' devices. The communication system 300 can be, for example, a hosted private branch exchange (PBX) system, which can also be referred to as a virtual PBX, a cloud-based PBX, an Internet telephony system, or an Internet Protocol (IP) PBX. Unlike a premises-based PBX, which typically requires PBX equipment to be physically located on or near the user premises where the PBX services are to be provided, a hosted PBX can provide PBX communication services over the Internet, including services such as, without limitation, voice over IP (VOIP), facsimile over IP (FOIP), call forwarding, voicemail, web-based online account management, and other similar PBX functions. In some embodiments, for example, a phone call or message to a phone number associated with the hosted PBX system is sent over the Internet to the hosted PBX system (e.g., via a PSTN or SMS Gateway), which connects the call or message over the Internet to a phone or other Internet-connected device of a subscriber to the hosted PBX system. The hosted PBX system may perform call routing services, which may include determining which phone number to use in coupling the incoming call to the subscriber, for example. Certain details of the communication system 300 are described below. Additional details are provided in commonly assigned pending U.S. patent application Ser. No. 12/957,125, entitled User Partitioning in a Communication System, which is expressly incorporated herein in its entirely by this reference.

The communication system 300 is partitioned into sub-systems so as to improve robustness and scalability of the overall system. The communication system 300 is partitioned into data centers 301 and 302. Each data center can be a point of presence that can include one or more servers, routers, switches, and network connections to support the communication system 300. Data center 301 and data center 302 can provide backup and redundancy to one another in an event that one of the data centers 301/302 (or one of the components within a data center 301/302) fails. In some implementations, data centers 301 and 302 can be located in different geographic locations or regions to decrease the likelihood that both data centers 301/302 would fail at the same time. While only two data centers are shown in FIG. 3, the communication system 300 can include any number of data centers greater (e.g., three data centers) or less (e.g., one data center) than those shown. Users of the communication system 300 (or subscribers) have an account on the communication system 300.

The communication system 300 shown in FIG. 3 is further partitioned into two user pods ("pods"); namely, a first pod (pod 1) and a second pod (pod 2). In some implementations, a pod can include a logical group of two or more pod units, where each pod unit of a pod can be situated in a different data center. Each pod can serve a different subset of user accounts of the communication system 300. Pod 1 is partitioned into pod unit 1A in data center 301, and pod unit 1B in data center 302. Similarly, pod 2 is partitioned into pod unit 2A in data center 301 and pod unit 2B in data center 302. While only two pods are shown in FIG. 1, the communication system 300 can include any number of pods greater (e.g., three pods) or less (e.g., one pod) than those shown.

Each pod unit 1A/1B and 2A/2B/2C can serve the same subset of users as the other pod units within a same pod. Each pod unit 1A/1B and 2A/2B/2C can include a message management server 119a-119d, each including one or more processors (not shown) configured to provide substantially the same services to the same subset of users as the other pod units within the same pod. The message management servers 119a-119d can include one or more networked computers with applications, application servers, or components installed that provide services to various client devices such as communication devices 143A-143D. For example, pod unit 1A can include a message management server 119a in data center 301 and pod unit 1B can include a message management server 119b in data center 302. Pod unit 1A and pod unit 1B belong to the same pod, so message management servers 119a-119b provide substantially the same services to the same subset of users. As another example, pod unit 2A can include a message management server 119c in data center 301, and pod unit 2B can include a message management server 119d in data center 302. Pod unit 2A and pod unit 2B, belong to the same pod, so message management servers 119c-119d provide substantially the same services to the same subset of users.

Each pod unit 1A/1B and 2A/2B/2C also can include an account database 121a-121d configured to support the respective message management servers 119a-119d for the subset of users. For example, pod unit 1A can include an account database 121a in data center 301 and pod unit 1B include an account database 121b in data center 302. As another example, pod unit 2A can include an account database in data center 301 and pod unit 2B can include an account database 121d in data center 302. In some implementations, each account database 121a-121d can store configuration details and other information regarding each user's account. The message management servers 119a-119d can also write to the account databases 121a-121d to change information associated with a user account. For example, while fulfilling a service request 131A/1331B, the message management servers 119a-119d can update or change information in the account database 121a-121d. As another example, if the service request 131A/131B includes a user changing details of their account (e.g. by accessing an online website for their account), then the message management servers 119a-119d will update the account database 121a-121d accordingly. The message management servers 119 can also establish outbound calls 320 and communicate over network 110 without going through the router 113A/113B.

Each pod includes a portion of a routing subsystem that includes routers 113A, 113B that can receive service requests from various communication external devices 143A-143D. The communication devices can include a cellular phone 143A, a landline phone 143B, a computer 143C, and a facsimile (fax) machine 143D, for example. A service request 131, for example, can include a request for voice, facsimile (fax), video, text, e-mail, web browsing, or data services from the communication system 200. In some embodiments, the service request 131 can be formatted according to a packet-based protocol, for example. In some embodiments, the service request 131 also can be formatted as a request according to the Session Initiation Protocol (SIP), the Hypertext Transfer Protocol (HTTP), an e-mail protocol (e.g. Simple Mail Transfer Protocol (SMTP), Post Office Protocol 3 (POP3), or SOAP (which previously stood for Simple Object Access Protocol), for example.

The router 113 system can identify (e.g., through extraction from the service request) an identifier that uniquely identifies a user account associated with service request 331. For example, in some embodiments, a user key 135 is extracted that provides a unique user or account identifier. The user key 135 can also include unique information associated with the user account, such as an e-mail address, a communication device identifier, or other information. The router 113A, 113B queries a global user directory 115A, 115B to determine which pod 1-2 should service the service request 131. In some embodiments, a GUD 115A, 115B stores a plurality of user identifiers, and a plurality of keys that can be mapped to the plurality of pods. In response, the GUD can return a pod identifier to the requesting router 113 that identifies the pod that provides services to the user account associated with the service request 131. The router 113A, 113B can then route the service request 331 to a pod unit associated with the pod identified by the GUD 115A, 115B.

If the pod unit associated with the pod identified by the GUD 115A is neither pod unit 1A nor pod unit 2A of the data center 301, the router 113A can route the service request 131A to another data center (e.g., as indicated by the arrow 341A) which may include the identified pod to support the service request 131A. Based on the pod identified by the GUD 115A, the router 113A can route the service request 113A directly to the pod unit that supports the service request 131A.

Data center 101 also includes a common database (DB) 307A and a message storage system (MSS) 311A. Similarly, data center 302 can includes a common database (DB) 307B and a message storage system (MSS) 311B. The MSS 311A can store files for the users served by the pod units 1A and 2A. These files can include, for example, messages (e.g., voicemail and facsimiles), user logs, system messages, system and user call prompts (e.g., auto-attendant or user-recorded greetings), and other types of call related or electronic messages. The contents of the MSS 311A can be synchronized with other data centers (e.g., synchronized with MSS 311B of data center 302), which can store similar information. Each pod unit 1A/2A also can be coupled to the common database 307A. The common database 307A can store shared data for all or portions of the pods, and can store consolidated information from the account databases 321 in the pods. The common database 307A also can facilitate changes made to the pod databases. For example, the common database 307A can also store the data for applications that provide the services on the message management servers 119. Different versions of the applications data can be stored in the common database 307A, which allows changes and upgrades to the message management servers 119 to be implemented efficiently and conveniently. Changes can be made to the common databases 307A and can be propagated to the pod units 1A/2A. The common database 307A also can be synchronized across data centers to another common database (e.g., common database 307B of data center 302), which performs a similar role for pod units 1B/2B.

Figure 4:
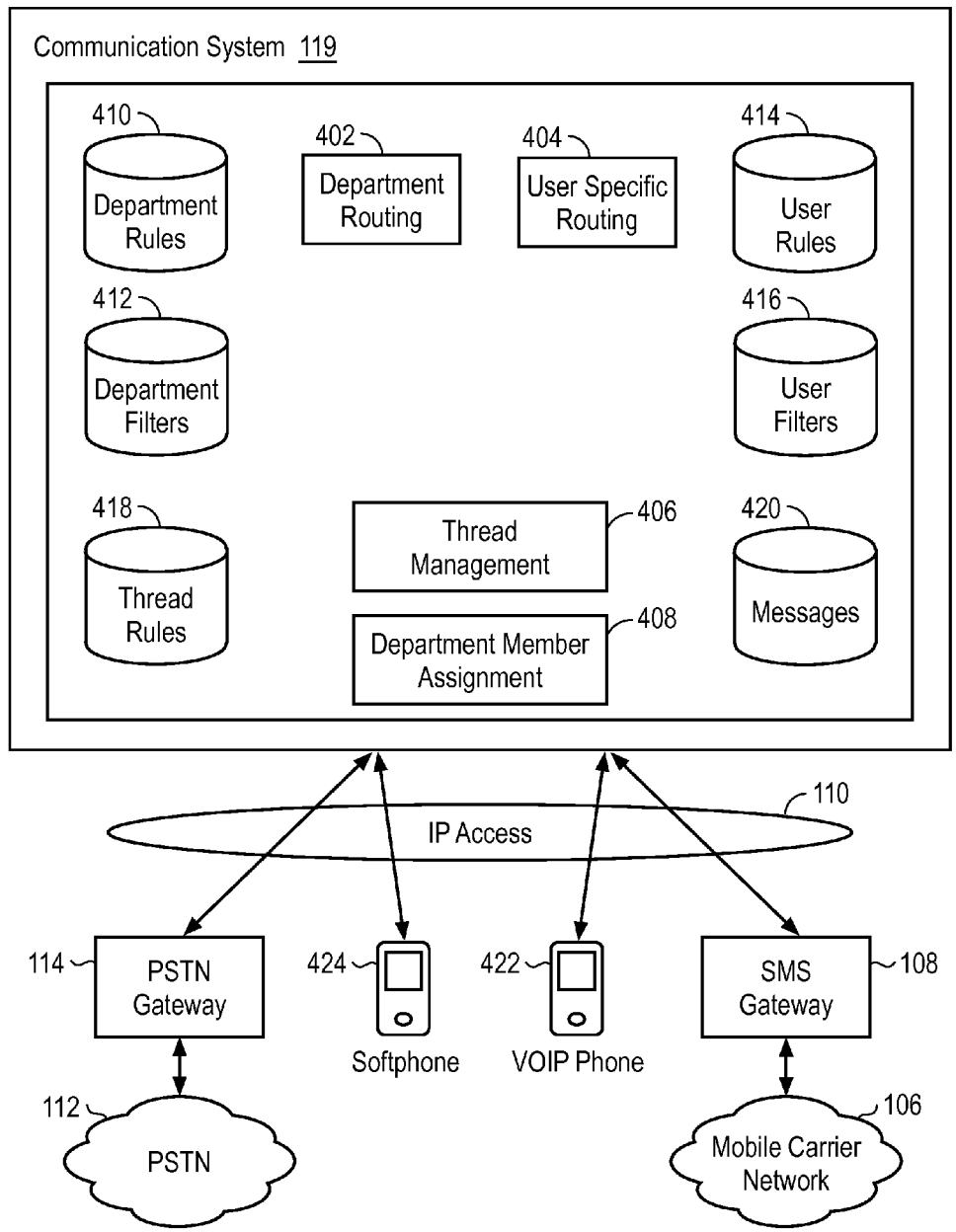
FIG. 4 is a block diagram showing a configuration of a message management server of the communication system of FIG. 3 to implement the departmental message system of FIG. 1 in accordance with some embodiments.

FIG. 4 is a block diagram showing a hardware configuration of functional modules in a message management server 119 of the communication system of FIG. 3 to implement the message system 100 of FIG. 1 in accordance with some embodiments. The server 119 represented in FIG. 4, and more particularly one or more processors (not shown) of the server, are configured to implement a departmental routing module 402, a user-specific routing module 404, thread management module 406 and a department member assignment module 408. Individual users and separate departments that comprise one or more department members can subscribe to services provided by the system 100. The department routing module 402 contains routing rules that can be customized for one or more departmental subscribers to the messaging services provided by the system 100. The user-specific routing module 404 contains routing rules that can be customized for one or individual users subscribers to the messaging services provided by the system 100. It will be appreciated that the server 119 is configured using program code (not shown) to implement the modules 402-408. The server 119 includes storage devices that include department message distribution rules storage 410, department filter storage 412, user-specific rules storage 414, user-specific filter storage 416 thread rules storage 418 and messages storage 420, each such storage being non-transitory. It will be appreciated that stored information may be stored in different memory locations within unitary storage system or can be distributed among distinct storage systems that may be located at different physical locations. Department message distribution rules storage 410 stores indications of all department rules used to determine distribution of messages to and from department members. Distribution rules 410 also stores indications of department members. The use cases of Chart 1 provide examples of use of department message distribution rules in accordance with some embodiments. It will be appreciated that the storage can be implemented in a combination of the common DB 307A, MSS 311 and account DB 121 illustrated in FIG. 3. The message management server 119 communicates over the Internet 110 with devices connected to the Internet, e.g., with a VOIP phone 422 or a softphone 424, or with devices (not shown) through an SMS gateway 108 to a mobile carrier network 106, or through a PSTN gateway 114 to a PSTN 112 as generally described above with reference to FIG. 1.

Figure 5:
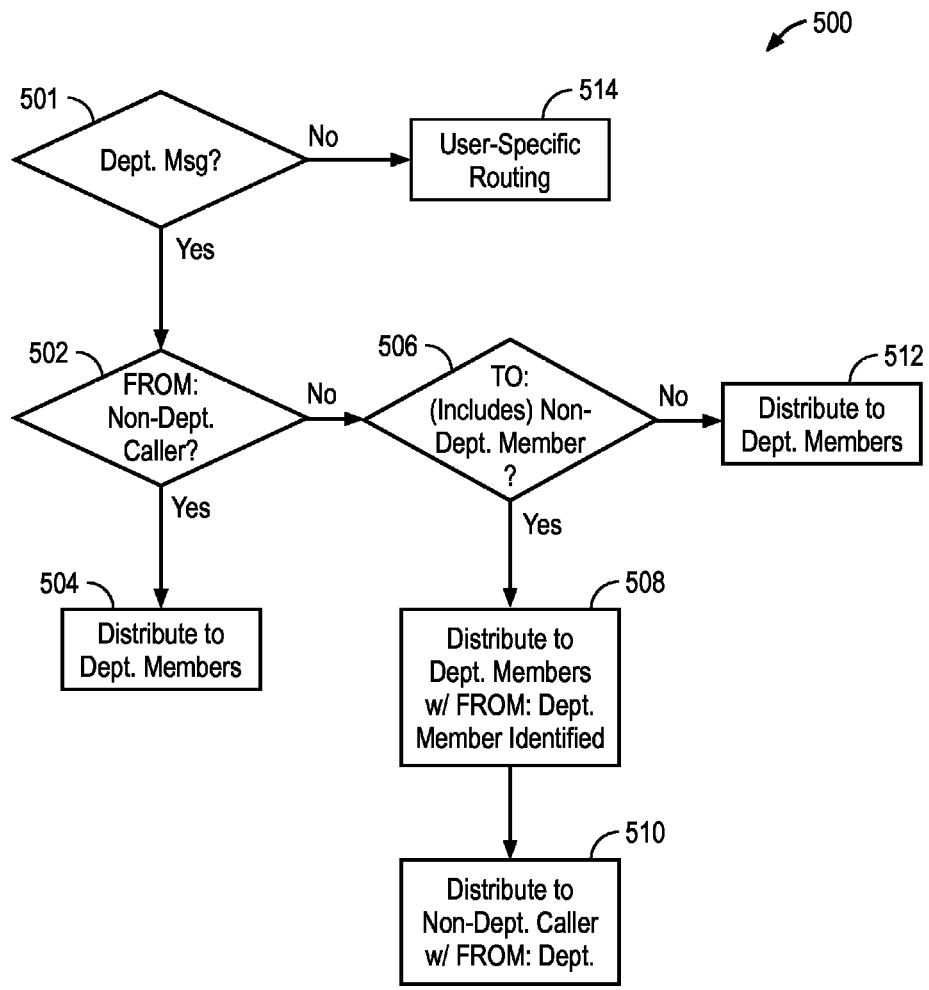
FIG. 5 is an illustrative flow diagram of a message routing process in accordance with some embodiments.

FIG. 5 is an illustrative flow diagram of a message routing process 500 implemented using the message management server 119 of FIG. 4 in accordance with some embodiments. The message routing process 500 can implement the use cases described above. The departmental routing process of FIG. 5 represents configuration of the message management server 119 according to program code (not shown) to implement function modules that generally correspond to blocks in the diagram.

In response to receipt of a message, module decision module 501 determines whether the message is addressed to the department. If decision module 501 determines that the message is directed to the department, then decision module 502, which is implemented by department routing module 402 refers to department distribution rules storage 410 to determine whether the received message is received from a non-departmental caller. If the message directed to the department is received from a non-department member, then module 504 sends the message to each designated member of the department. In some embodiments, there may be special department message distribution rules in department rules storage 410 that determine the particular department members to whom the message is delivered. The rules, for example, may condition delivery upon a department member being 'on duty', for example. The rules may condition delivery upon the subject matter of the message; for example, different department members may be designated to handle different kinds of subject matter, which can be manually defined in the message or determined by the application of well-known natural language processing techniques ("NLP") to the message.

If decision module 504 determines that the message is received from a department member, then decision module 506 determines whether the received message is addressed to a non-department member. If decision module 506, which is implemented by department routing module 402 refers to department routing rules 410, determines that the message is directed to a non-department member, i.e. to a department outsider, then module 508 sends the message to all department members and indicates, within the messages to the other department members, the identity of the department member sending the message. Also, if decision module 506 determines that the message is directed to a non-department member, then module 510 sends the message to the non-department member with an indication that the message is from the department, i.e. without identifying the particular department member sending the message. On the other hand, if decision module 506 determines that the message is not directed to a non-department caller, then module 512 sends the message to designated department members and indicates in the message the identity of the department member sending the message.

If decision module 501 determines that the message is not addressed to the department, then module 514, which is implemented by user specific module routing 404 refers to user specific rules 414 to direct use of user-specific rules to send the message. It will be appreciated that individual user subscribers can subscribe and establish an account to receive custom message routing services from the system 100. Referring to FIG. 4, in some embodiments, user-specific rules are indicated within storage 404. The user-specific rules may indicate, for example, what number to use to send a message to the addressee of the message. A user who is an addressee of a message, whether or not that user is a department, may use different numbers at different times, for example. In some embodiments, the user of the communication system may configure rules to determine the telephone number to which to send the message based on the date or time the message is received (e.g., weekdays, weekends, business hours, after business hours) or the location of the user when the message is received (e.g., as determined from GPS, cellular phone tower, proximity to WiFi networks, or other location information). The rules may also include a priority list of different telephone numbers to which to send the message, and the communication system may attempt to deliver the message in the order defined by the priority list. Such forwarding or routing rules are used in hosted private branch exchange ("PBX") systems for the routing or forwarding of telephone calls and can in many cases also be applied to the routing or forwarding of messages. In some embodiments, rules for forwarding or routing telephone calls can automatically be applied to the forwarding or routing of messages, provided that the devices to which messages are to be forwarded or routed are capable of sending and/or receiving messages. Commonly assigned U.S. Pat. No. 8,213,587, invented by Vendrow, issued Jul. 3, 2012, which is expressly incorporated herein in its entirely by this reference, discloses user-specific call routing rules.

Figure 6:
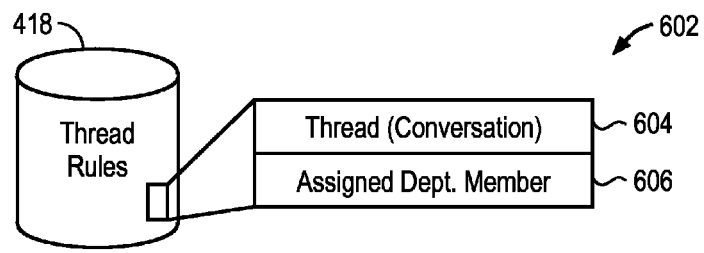
FIG. 6 is an illustrative diagram to show an example thread rules data structure encoded in a non-transitory storage device to implement conversation thread rules in accordance with some embodiments.

FIG. 6 is an illustrative diagram to show an example thread rules data structure 602 encoded in a non-transitory storage device 418 to implement conversation thread rules in accordance with some embodiments. As used herein, a 'conversation' or 'thread' comprises a sequence of messages in which messages in the sequence are responses to prior messages in the sequence or are otherwise related according to the subject matter of the messages, which can be manually defined in the messages or determined by the application of well-known natural language processing techniques ("NLP") to the messages. The data structure includes a thread (conversation) identifier field 604 and an assigned department member field 606. As explained more fully below, messages include thread identifiers; in some embodiments, the thread identifier is a unique number. In some embodiments, the unique identifier can be assigned by the communication system to the thread based on the individuals or departments communicating over the thread and the time period over which the communications occur. Also, as explained more fully below, in some embodiments, department members can be assigned responsibility for responding to non-department caller's messages sent to the department. As explained above with reference to FIG. 4 and as explained below with reference to FIG. 8, a given department member assigned to handle a particular non-department member caller message may be accorded special treatment with respect to messages of a thread that includes that given caller message (e.g., such messages may be prioritized in the responsible department member's inbox).

Figure 7:
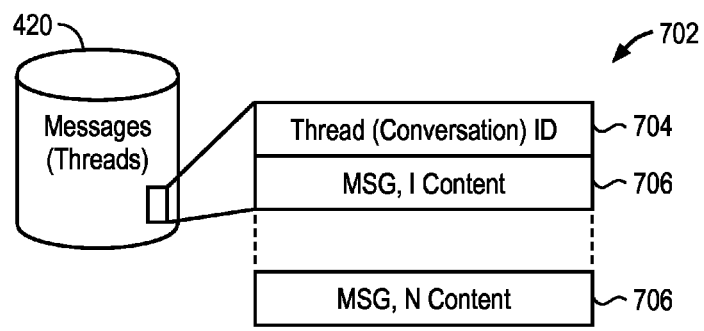
FIG. 7 is an illustrative diagram to show an example thread messages data structure encoded in a non-transitory storage device in accordance with some embodiments.

FIG. 7 is an illustrative diagram to show an example thread messages data structure 702 encoded in a non-transitory storage device 420 in accordance with some embodiments. For each thread identified in the thread rules data structure 602 of FIG. 6, the thread messages data structure 702 includes a thread identifier field 704 and one or more message records 706 each including message content (or a reference thereto) of a message associated with a thread identifier (e.g., an assigned phone number) indicated within a corresponding thread identifier field 702. It will be appreciated that the respective thread conversation identifier fields 604, 704 of the thread rules data structure 602 and the thread messages data structure 702 may be used to associate thread rules and message threads within a relational database, for example.

Figure 8:
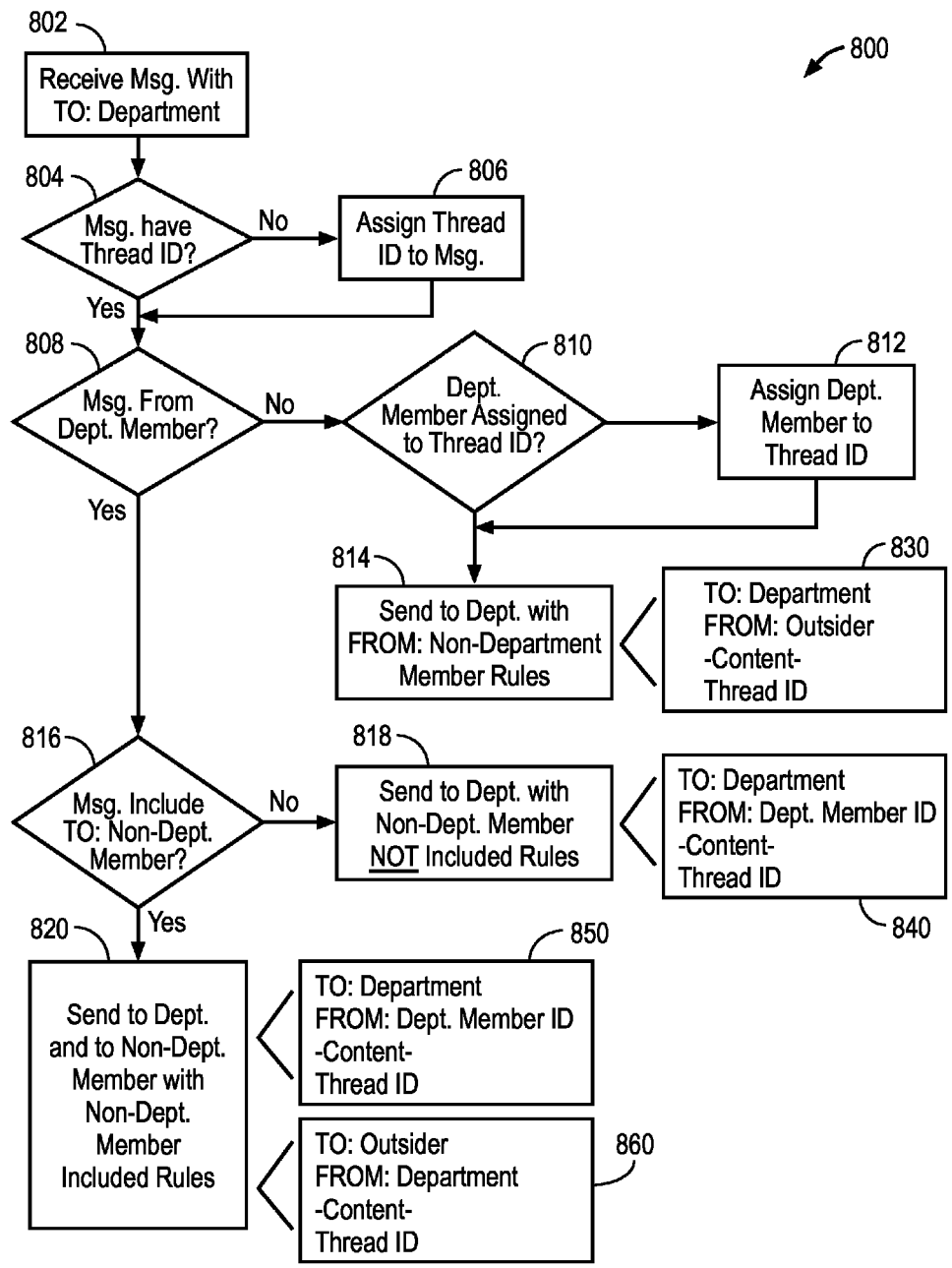
FIG. 8 is an illustrative flow diagram showing details of a departmental messaging process that implements department message distribution rules in accordance with some embodiments.

FIG. 8 is an illustrative flow diagram showing details of a departmental messaging process 800 that implements department message distribution rules of department rules storage 410 of the message management server 119 of FIG. 4 in accordance with some embodiments. The departmental message sending process 800 represents configuration of the message management server 119 according to program code (not shown) to implement function modules that generally correspond to modules of FIG. 4. Persons skilled in the art will appreciate that the process 800 of FIG. 8 works in conjunction with and may be integrated with the process 500 of FIG. 5.

Module 802 receives a message addressed to the department. Decision module 804, which is implemented by the thread management module of 406 of the server 119, parses the received messages and references the thread rules storage 412 to determine whether the message corresponds to a previously assigned thread identifier. If decision module 804 determines that no thread identifier is associated with the received message, then control flows to module 806, which is implemented by thread management module 406, which assigns a new thread identifier to the message and creates a record in the thread rules storage 418 that includes a thread identifier field 604 that stores the new thread identifier and also creates a record in the messages storage 420 that includes a thread identifier field 704 and that includes content of the received message. As explained above, with reference to FIGS. 6-7, in some embodiments, a relational database associates a data structure 602 in the thread rules storage 418 that includes the newly assigned thread identifier with a data structure 702 in the messages storage 420 the message content and the same newly assigned thread identifier.

Control flows to decision module 808 following module 806, and alternatively, if decision module 804 determines that a thread identifier already is associated with the received message. Decision module 808 is implemented by the thread management module of 406, determines whether the message is received from a department member. If decision module 808 determines that the message is not received from a department member, then decision module 810, which is implemented by module 408 of the server 119, may optionally be used to determine whether a department member has been assigned to the thread. If decision module 810 determines that no department member has been assigned to the thread, then module 812, which is implemented by module 408, assigns a department member to the thread. The manner in which a department member is assigned to a thread forms no part of the invention and may be accomplished by any of many different techniques such as a 'round robin' approach, or setting up a queue from which department members choose, or based upon load balancing process to balance the number messages handled at any given time by each department member, for example. The thread management module 408 of the server 119 cooperates to add an identifier of the assigned department member to an assigned department member field 606 of a corresponding data structure 602 in the thread rules storage 418. Following the optional assignment of a department member by module 812, module 814 sends messages 830. A corresponding data structure 702 in the messages storage 420 is updated to include the message 830.

In some embodiments, messages 830 a department-wide message that includes the content of the received message and a thread identifier together with an indication to the message recipients that the message is being sent to the department (i.e. to all designated department members) and with an indication to the message recipients that the message is received from an outside the department, i.e. from a non-department member.

On the other hand, if decision module 808 determines that the message is received from a department member, then control flows to decision module 816, which determines whether the message is addressed to a department outsider, i.e. a non-department member. If decision module 816 determines that the message is not directed to a department outsider, then control flows to module 818, which sends messages 840. A corresponding data structure 702 in the messages storage 420 is updated to include the message 840.

In some embodiments, messages 840 are a department-wide that includes the content of the received message and a thread identifier together with an indication to the message recipients that the message is a department message and with an indication to message recipients that identifies the department member who sent the message.

On the other hand, if decision module 816 determines that the message is directed to a department outsider, i.e. a non-department member, then control flows to module 820, which sends the message department-wide via messages 850 and sends the message content to the outsider via a message 860. A corresponding data structure 702 in the messages storage 420 is updated to include the messages 850 and 860.

In some embodiments, messages 850 are a department-wide that includes the content of the received message and a thread identifier together with an indication to the message recipients that the message is a department message and with an indication to message recipients that identifies the department member who sent the message.

In some embodiments, message 860 is a message sent to the department outsider that includes the content of the received message and a thread identifier together with an indication to the message recipient that the message is a department message sent by the department without identifying the particular department member who originated the message. In other embodiments message 860 includes an indication that identifies both the department and the particular department member who originated the message.

Figure 9:
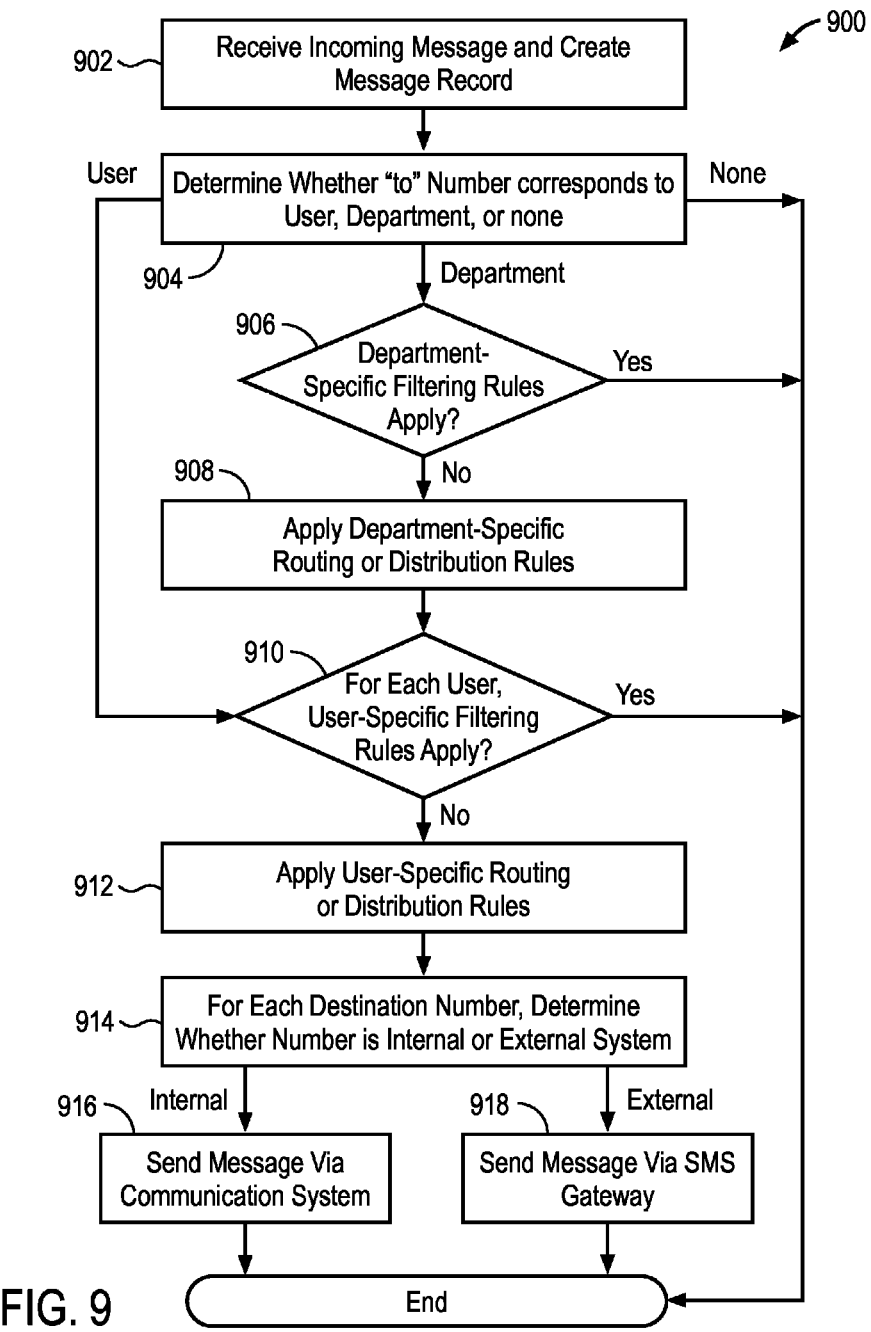
FIG. 9 is an illustrative flow diagram showing details of process involving department routing rules, user-specific routing rules and filters in accordance with some embodiments.

FIG. 9 is an illustrative flow diagram showing details of process 900 involving department routing rules, user-specific routing rules and filters in accordance with some embodiments. The process 900 represents configuration of the message management server 119 according to program code (not shown) to implement function modules that generally correspond to blocks in the diagram. Persons skilled in the art will appreciate that the process 900 of FIG. 9 works in conjunction and may be integrated with the processes 500 and 800 of FIGS. 5 and 8, respectively.

Module 902 receives an incoming message and creates a message record. Module 904 determines whether the message addressee field, e.g., the "To:" field, indicates individual user, department or "none". If the addressee indicates "none", then the process ends. If the addressee field indicates department, then module 906 determines whether department-specific filter rules provided in department filter rules 412 apply to block the message. In some embodiments, filter rules can determine whether the sender is a member of white lists of permitted senders (in which case filtering rules do not apply and the message is not filtered) or black lists of prohibited senders (in which case filtering rules apply and the message is filtered). In other embodiments, filter rules can apply well known bulk messaging, i.e., spam, filters to determine whether the incoming message is a bulk message or spam. If department-specific filter rules do apply, then the process ends. If department-specific filter rules do not apply, then module 908 applies department-specific routing or distribution rules to the message.

Following module 908 or following a determination by module 904 that the addressee is a 'user', control flows to module 910, and for each user who is to receive the message content, i.e. department outsiders and/or department members, a determination of whether user-specific filter rules provided in user filters 416 apply to block the message. These filter rules can include the white list, black, list, or bulk message/spam filters, described above, that are customized to the specific user rather than the department as a whole. For example, a user can define specific white lists or black lists, or provide a marking of messages to train the bulk message/spam filter as to what types of messages are more likely to be bulk message/spam. For each such user, if a user-specific filter rule applies, then the process ends for that user. For users not blocked by user-specific filter rules, module 912 applies user specific routing or distribution rules. Module 914 determines for each message to be sent to a user whether a destination phone number for that message is internal or external to the system 100. Destination phone numbers internal to the system correspond to users of the system 100, i.e., subscribers to the communication services provided by the system. By contrast, destination phone numbers external to the system correspond to individuals who are not users of the system 100, i.e., subscribers to communications services not provided by the system, such as cellular telephone subscribers. Accordingly, if the message is determined to be internal, then module 916 sends the message via the communication system without having to communicate outside of the system. If the message is determined to be external, then module 918 sends the message via an SMS gateway. Some advantages of sending internal messages via the communication system are decreased time and lowered costs for processing and transmitting the messages as a result of not having to interface with the SMS gateway and cellular telephone carriers.

Figure 10:
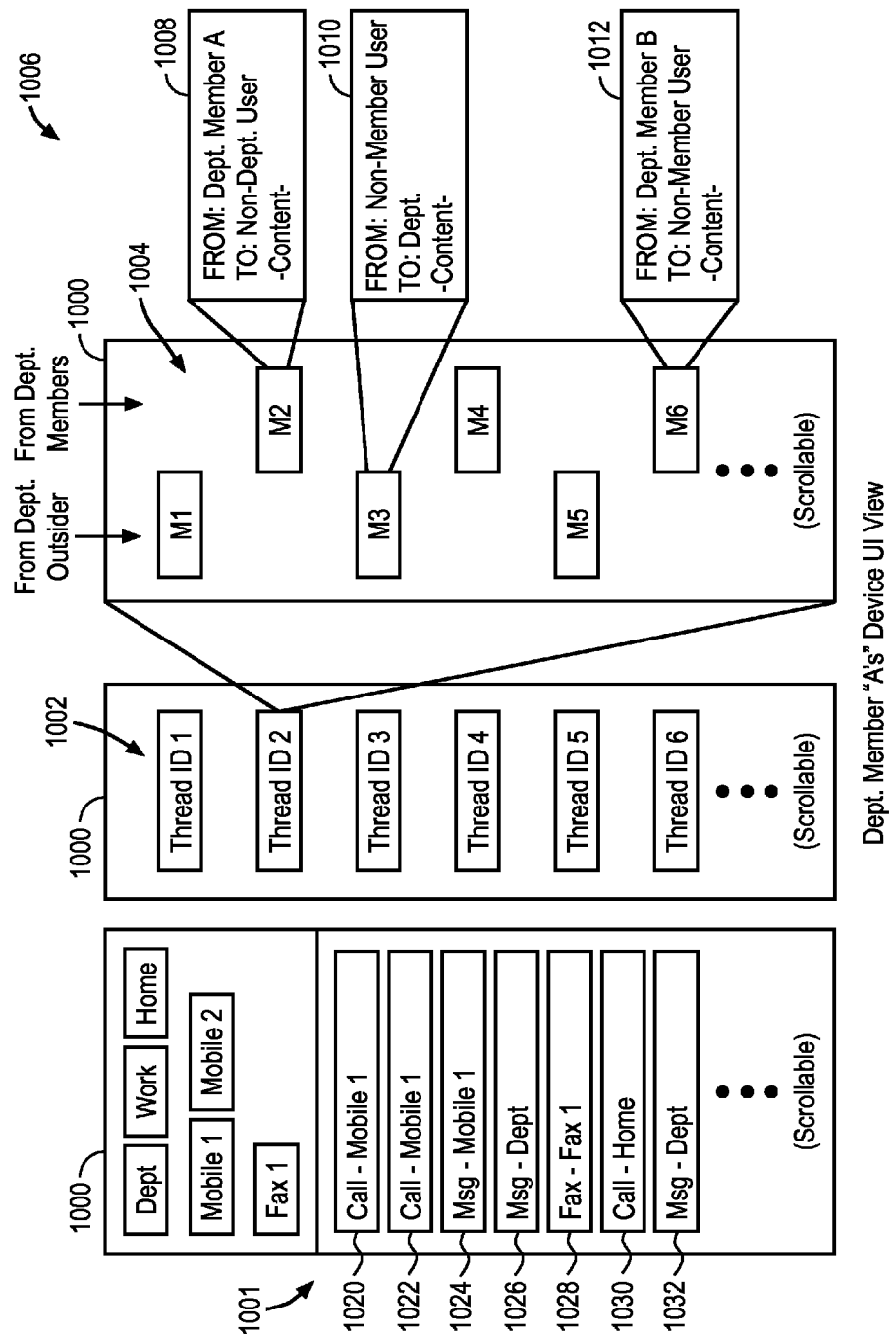
FIG. 10 is an illustrative drawing representing a department member user device user interface that shows a user interface (UI) showing list of department wide message threads, a UI showing an expansion of a selected thread from the list and enlargements of certain individual messages in the selected thread in accordance with some embodiments.

FIG. 10 is an illustrative drawing representing a department member user device 1000 showing three different user interface (UI) views of the device 1000 and showing details of messages from one of the UI views in accordance with some embodiments. The system 100 routes to the device 1000, calls, messages and faxes, for example, placed to any of several designated telephone numbers. More particularly, in some embodiments, calls, messages and faxes placed to any of multiple telephone numbers designated as being associated with the device 1000 are routed by system 100 to the device 1000. A first UI view 1001 provides a unified call interface in which indications of calls, messages and faxes made or received using any of the numbers associated with the device 1000 are shown. Commonly owned U.S. patent application Ser. No. 12/958,181, which has been expressly incorporated herein in its entirety, discloses an embodiment of an example of such an interface. In the illustrative example, assume that calls/messages/faxes are indicated in chronological order. The example interface 1001 indicates voice calls 1020, 1022 on a mobile1 phone number device; a message 1024 on the mobile1 phone number; messages 1026, 1032 on a department phone number; a fax 1028 on a fax1 phone number; and a call 1030 on a home phone number.

The first UI view 1001 also provides a control button for each phone number served by the device 1000. In some embodiments, a user actuates control buttons (labeled "dept", "work", "home", "mobile1", "mobile2", "fax1") each corresponding to a different phone number associated with the device 100 and each used to select its corresponding number from which to make a call or send a message, for example. In some embodiments, a user actuates a UI control (not shown) to selectively display a list containing only calls or messages (or indications of message threads) or faxes made or received using a selected phone number.

In this illustrative example, the second UI view 1002 displays a list of message threads identifiers involving the department phone number. In other words, in the second UI view 1002, each message thread includes a sequence of one or more messages, and the UI view 1002 provides a separate message thread identifier that provides a visual UI indication of each message thread. Thus, the second UI view 1002 shows a list of department wide message threads. It will be understood that the system 100 sends to the department members' user devices information such as computer program instructions (no shown) used by the devices to generate the message thread identifiers.

A third UI view 1004 shows an expansion of a selected thread identifier from the list of UI view 0112. In some embodiments, a user selects (e.g., clicks on) a thread indicator to expand the view of the selected thread to show the messages within that thread in chronological order in which each message in the thread is responsive to a previous message in the thread. It will be recalled that messages are stored in message thread storage 420. Information used to by the device 1000, such as computer program instructions, used by the device 1000 to display these messages in chronological order is sent by the system 100 to the department user devices. Enlargements of certain individual messages 1008-1012 in the selected thread also are shown. The user interface (UI) shows a list of thread identifiers. Constituents of the list, for example, may display assigned phone numbers associated with each constituent thread or some other indicator to identify the thread and to differentiate it from the other threads in the list. Assume in this example that the device 1000 belongs to department member "A" who has been assigned responsibility for thread ID 1-thread ID 3. Assume further that thread ID 4-thread ID 6, etc. are either assigned to other department members or are unassigned. The UI thread list display 1002 displays the threads, thread ID1-thread ID3 assigned to department member "A" in a manner to highlight their assignment to department member user "A". In this example, thread ID1-thread ID3 are grouped together to show their assignment to department member "A". Alternatively, for example, thread ID1-thread ID3 could be shaded or colored differently from other thread IDs on user "A's" device or includes some marker to indicate their assignment to user "A". Thus, although department user "A" receives numerous department-wide threads, the UI 1002 provides an indication to user "A" of which threads are assigned to him or her.

In this example, the device 1000 generates UI display 1004 in response to command received from user "A" to expand the view of thread ID2. In this example, thread ID2 includes messages M1-M6, etc., message M1 being the first message received followed by message M2, etc. Assume in this example that messages M1, M3 and M5 are sent by a department outsider and that messages M2, M4 and M6 are sent by department members.

Referring to the message enlargements 1006, message M1 in the UI of department member "A's" device 1000 indicates that the message is From: department member "A" (the 'owner' of device 1000). M1 indicates that the message is To: department outsider, perhaps by name or perhaps by phone number, for example. M1 also includes the message content. Message M3 in the UI of department member "A's" device 1000 indicates that the message is From: department outsider, perhaps indicating name or phone number, for example. M3 indicates that the message is To: Department, not to an individual department member even though department member "A" is assigned to handle Thread ID 2 of which M3 is a constituent message. M3 also includes the message content. Message M6 in the UI of department member "A's" device 1000 indicates that the message is From: department member "B", who is not the 'owner' of device 1000. M6 indicates that the message is To: department outsider. Message M6 also includes the message content.

Thus, a department member "B" different from department member "A" who is assigned responsibility for the thread ID2 sent one of the messages included in the thread ID2, and user "A" can actually see that message and can see that is was sent by department member "B". In some embodiments, different department members may discuss matters specific to their department on a particular thread. In other embodiments, different department members may contribute their particular expertise to a particular thread with an outside customer. It will be appreciated that messages M1-M6 may include additional information, e.g. thread identifiers and indication of assigned department member.

Figure 11:
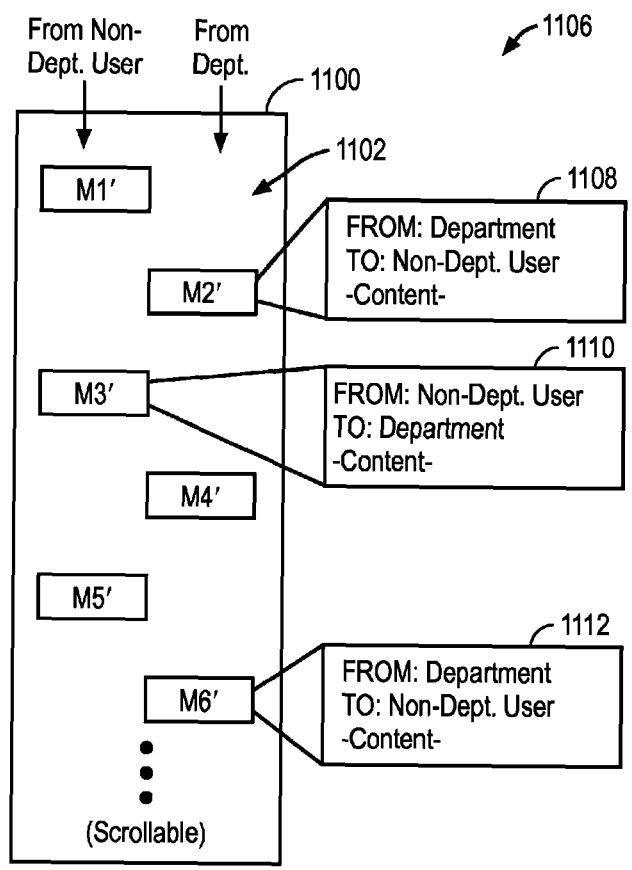
FIG. 11 is an illustrative drawing representing a non-department outside user device UI showing a thread that corresponds to the selected thread shown in FIG. 10 and that shows enlargements of certain individual messages that correspond to the messages enlarged in FIG. 10 in accordance with some embodiments.

FIG. 11 is an illustrative drawing representing a non-department outside user device 1100 UI showing a thread 1104 that corresponds to the selected thread shown in FIG. 10 and that shows enlargements of certain individual messages 1106 that correspond to the messages enlarged in FIG. 10 in accordance with some embodiments. The messages M1'-M6' in the thread UI 1102 of the outsider device 1100 correspond directly to messages M1-M6 of the department member "A" thread UI 1002. Message M1' indicates that the message is From: Department (not department member "A"). M1' indicates that the message is To: department outsider. M1' also includes the message content. M3' indicates that the message is From: department outsider. M3' indicates that the message is To: Department. M3' also includes the message content. M6' indicates that the message is From: Department. M6' indicates that the message is To: department outsider. Message M6' also includes the message content.

Thus, the outsider who is associated with device 1100 does not receive any indication that different individual department members have sent messages within the message thread 1102. By providing the outside user, such as a customer, with an indication of the department and not individual department members, the customer does not know the individual department member(s) he is communicating with. Thus, if the department member(s) change (e.g., member(s) added or removed from the department, member(s) with greater expertise take over the thread), the customer does not know and only receives an indication of the department he or she is communicating with.

The invention claimed is:

1. A hosted private branch exchange (PBX) system comprising:
   non-transitory storage that includes subscriber identifying information that identifies a subscriber to a message routing service;
   non-transitory storage that includes distribution rules information associated with the identified subscriber; and
   a message management server configured to receive a message sent over the Internet to the identified subscriber and to send the message over the Internet to one or more devices according to the distribution rules associated with the identified subscriber;
   wherein the subscriber identifying information identifies a department subscriber to the message routing service and department members;
   wherein the distribution rules information includes department message distribution rules associated with the identified department subscriber;
   wherein the department message distribution rules include a first rule for distribution of a message received from a department outsider that is directed to the department;
   wherein the message management server distributes messages to the identified department members, according to the first rule, that include content of a message received from the department outsider and directed to the department;

wherein the message management server is configured to associate a thread identifier to a message received from a department outsider and to include the associated thread identifier with the messages that it distributes to the identified department members according to the first rule;

wherein the department message distribution rules include a second rule for distribution of a message received from a department member that is directed to a department outsider;

wherein the message management server distributes messages to a department outsider and to the identified department members, according to the second rule, that include message content received from a department member that is directed to the department outsider;

wherein the message management server provides an indication of an identity of the department member that the message content is received from in the messages distributed to the identified department members; and wherein the message management server provides an indication in the message distributed to the identified department outsider that the message content is received from the department but does not provide an indication in the message distributed to the identified department outsider of the identity of the department member that the message content is received from.

2. The system of claim 1,
wherein the subscriber identifying information identifies an individual user subscriber to the message routing service; and
wherein the distribution rules information includes user-specific message distribution rules associated with the identified individual user subscriber.

3. The system of claim 1,
wherein the message management server provides an indication in the messages distributed to the identified department members that the message content is received from a department outsider.

4. The system of claim 3,
wherein the message management server identifies the department outsider that the message content is received from in the messages distributed to the identified department members.

5. The system of claim 1,
wherein the message management server is configured to create a message thread in which each message in the thread is responsive to a previous message in the thread and in which each message in the thread is associated with the same thread identifier.

6. The system of claim 1,
wherein the message management server is configured to associate a department member with a message thread and to provide an indication to the identified department members of the department member assigned to the thread identifier.

7. The system of claim 1,
wherein the message management server identifies the department member that the message content is received from in the messages distributed to the identified department members; and
wherein the message management server does not identify the department member that the message content is received from in the messages distributed to the department outsider.

8. The system of claim 1,
wherein the message management server is configured to associate a thread identifier to a message received from a department member and to include the assigned thread identifier with the messages that it distributes to the identified department members and to the department outsider according to the second rule.

9. The system of claim 1,
wherein the department message distribution rules include a third rule for distribution of a message received from a department member that is directed to the department;
wherein the message management server distributes messages to the identified department members according to the third rule that include message content received from a department member that is directed to the department.

10. The system of claim 9,
wherein the message management server provides an indication in the messages distributed to the identified department members that the message content is received from a department member.

11. The system of claim 10,
wherein the message management server identifies the department member that the message content is received from in the messages distributed to the identified department members.

12. The system of claim 9,
wherein the message management server is configured to associate a thread identifier to a message received from a department member and to include the assigned thread identifier with the messages that it distributes to the identified department members according to the third rule.

13. A method to produce a department message thread in a non-transitory storage device comprising:
producing messages according to a first rule for distribution of a message received from a department outsider that is directed to the department, requiring sending messages including received message content to department members wherein a department outsider that the message content is received from is identified in the messages sent to the department members;
producing messages according to a second rule for distribution of a message received from a department member that is directed to a department outsider, requiring sending messages including received message content to department members wherein the department outsider and a department member from whom the message content is received are identified in the messages sent to the department members, and sending a message including received message content to the department outsider wherein the department, but not the identity of the department member that the message content is received from, is identified in the messages sent to the department outsider;
producing messages according to a third rule for distribution of a message received from a department member that is directed to the department, requiring sending messages including received message content to department members wherein a department member that the message content is received from is identified in the messages sent to the department members; and
creating a department message thread structure for produced messages sent to department members in which messages in the thread are ordered chronologically such that each message in the thread is responsive to a previous message in the thread and in which each message in the thread is associated with the same thread identifier.

14. A method for generating a display within a user device display screen that represents messages within a department message thread produced according to the process of claim 13 comprising:

associating, in non-transitory storage device the created department message thread with a thread identifier;

sending to the user device, information that can be used by the device to display an indication of the thread identifier associated with the created department thread structure; and sending to the user device, information that is associated with the indication of the thread identifier and that can be used by the device to display the messages in the created thread structure in the chronological order.

15. The method of claim 14 further including:

sending to the user device information that can be used by the device to display in association with the messages an indication of an identity of a department member assigned to the thread.

16. The method of claim 6, wherein the message management server is configured to not provide an indication to the department outsider of the department member assigned to the thread identifier.

17. The method of claim 13, associating a department member with the message thread and providing an indication to the identified department members of the department member assigned to the message thread.

18. The method of claim 17 further including:

not providing an indication to the department outsider of the department member assigned to the message thread.

* * * * *